United States Patent
Kuo

(10) Patent No.: US 7,742,494 B2
(45) Date of Patent: Jun. 22, 2010

(54) METHOD AND RELATED APPARATUS FOR IMPROVING MIMO PROCEDURE IN A WIRELESS COMMUNICATIONS SYSTEM

(75) Inventor: Richard Lee-Chee Kuo, Taipei (TW)

(73) Assignee: Innovative Sonic Limited, Road Town, Tortola (VG)

( * ) Notice: Subject to any disclaimer, the term of this patent is extended or adjusted under 35 U.S.C. 154(b) by 126 days.

(21) Appl. No.: 12/010,191

(22) Filed: Jan. 22, 2008

(65) Prior Publication Data

US 2008/0175334 A1 Jul. 24, 2008

Related U.S. Application Data

(60) Provisional application No. 60/885,921, filed on Jan. 22, 2007.

(51) Int. Cl.
*H04Q 11/02* (2006.01)
(52) U.S. Cl. .................................................. 370/430
(58) Field of Classification Search ................ 370/338, 370/430, 431, 465, 210, 482, 329, 352, 204, 370/208, 252; 375/299, 220–222, 144, 260; 455/574, 522, 434, 450, 562, 561, 436, 439, 455/452, 466, 557, 550, 424; 714/748, 749
See application file for complete search history.

(56) References Cited

U.S. PATENT DOCUMENTS

| | | | |
|---|---|---|---|
| 7,269,127 B2* | 9/2007 | Mody et al. .................. | 370/210 |
| 7,385,959 B1* | 6/2008 | Loc .............................. | 370/338 |
| 2004/0082356 A1* | 4/2004 | Walton et al. ................ | 455/522 |
| 2005/0026616 A1* | 2/2005 | Cavalli et al. ................ | 455/436 |
| 2005/0286408 A1* | 12/2005 | Jin et al. ...................... | 370/208 |
| 2006/0288204 A1* | 12/2006 | Sood et al. ................... | 713/161 |
| 2007/0064949 A1 | 3/2007 | Choi | |
| 2007/0183303 A1* | 8/2007 | Pi et al. ....................... | 370/206 |
| 2008/0080449 A1* | 4/2008 | Huang et al. ................ | 370/342 |
| 2008/0151743 A1* | 6/2008 | Tong et al. ................... | 370/204 |
| 2008/0175329 A1* | 7/2008 | Kuo ............................. | 375/260 |
| 2008/0313519 A1* | 12/2008 | Tseng ......................... | 714/748 |

FOREIGN PATENT DOCUMENTS

KR 1020060007617 1/2006

OTHER PUBLICATIONS

3GPP TSG-RAN WG2 Meeting #56 (Nov. 6-10, 2006), Change Request R2-063342 "LS on status of Rel-7 FDD MIMO," pp. 1-20.

(Continued)

*Primary Examiner*—Pankaj Kumar
*Assistant Examiner*—Prenell P Jones
(74) *Attorney, Agent, or Firm*—Winston Hsu

(57) ABSTRACT

In order to save radio resources, the present invention provides a method for improving a multi-input multi-output, known as MIMO, procedure for a network of a wireless communications system. The method includes the following steps. Only two parameter values are used in a MIMO operation information element, also called IE, of a MIMO parameter IE, to indicate a user equipment, called UE hereinafter, to start or continue MIMO operation. The UE is indicated to stop the MIMO operation when the MIMO parameter IE is not included in an ACTIVE SET UPDATE, CELL UPDATE CONFIRM, or any reconfiguration message sent to the UE.

16 Claims, 4 Drawing Sheets

OTHER PUBLICATIONS

3GPP TSG-RAN WG2 Meeting #56bis, Draft Change Request R2-070241 rev1 "Proposed CR to TS 25.331 [Rel-7] on Introducing MIMO in RRC specification," pp. 1-3.

3GPP TS 25.331 V7.3.0 (Dec. 2006) Radio Resource Control (RRC); Protocol Specification (Release 7), pp. 1-1316.

3GPP TSG-RAN WG2 meeting # 56-bis, Jan. 15-19, 2007, Impact of MIMO on Ran2 specifications, R2-070194. XP-002482050.

3GPP TSG-RAN2 Meeting # 57, Feb. 12-16, 2007, Change Request R2-071092, Proposed CR to TS 25 331 (Rel-7) on Introducing MIMO in RRC specification, pp. 1-53. XP-002482056.

3GPP TSG-RAN WG2 Meeting # 56-bis, Jan. 15-19, 2007, Change Request R2-070192, Introducing MIMO in HSDPA stage 2 specification. XP- 002482052.

* cited by examiner

METHOD AND RELATED APPARATUS FOR IMPROVING MIMO PROCEDURE IN A WIRELESS COMMUNICATIONS SYSTEM

CROSS REFERENCE TO RELATED APPLICATIONS

This application claims the benefit of U.S. Provisional Application No. 60/885,921, filed on Jan. 22, 2007 and entitled "Method And Apparatus for Improving MIMO Procedures in a Wireless Communication System", the contents of which are incorporated herein by reference.

BACKGROUND OF THE INVENTION

1. Field of the Invention

The present invention relates to a method for improving a procedure for a wireless communications system and related communications device, and more particularly to a method for improving a MIMO procedure for a network terminal and a UE of a wireless communications system and related communications device.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting at the third generation mobile telecommunication technology, the 3rd Generation Partnership Project (3GPP) provides High Speed Package Access (HSPA) technology, which includes High Speed Downlink Package Access (HSDPA) and High Speed Uplink Package Access (HSUPA), to increase bandwidth utility rate and package data processing efficiency so as to improve uplink/downlink transmission rate.

To further increase the downlink data rate, 3GPP introduces a Multi-input Multi-output (MIMO) technology, with which a user equipment (UE) and a base station, known as a Node-B, utilize multiple antennas to transmit/receive radio signals. Besides, the MIMO technology can be further incorporated with spatial multiplexing, beam forming and spatial diversity technologies to reduce signal interference and increase channel capacity. In the prior art, the MIMO operation is mainly employed to the HSDPA system, doubling the peak rate of high speed downlink share channel (HS-DSCH). Concerning radio resource control (RRC) states of the UE, the MIMO operation is only applicable for the UE in CELL_DCH state.

To control MIMO operation of the UE, a universal terrestrial radio access network (UTRAN) can set configuration of MIMO operation in RRC messages with information elements (IEs) and send the RRC messages to the UE through corresponding RRC procedures. According to an RRC protocol specification of 3GPP, a MIMO parameter IE includes a MIMO operation IE, a MIMO N/M Ratio IE and a MIMO Pilot Configuration IE. The MIMO N/M Ratio IE includes information about the antenna numbers of the UE and the Node-B. The MIMO Pilot Configuration IE includes information about diversity, channelization code, etc. The MIMO operation IE is utilized to indicate the UE to activate, continue or stop the MIMO operation, and correspondingly includes three possible parameter values, which represent "start", "continue" and "stop", respectively.

The UTRAN can use an ACTIVE SET UPDATE, CELL UPDATE CONFIRM, or any reconfiguration message to include the MIMO parameter IE and then sends these messages to the UE. On the other hand, the UE contains a MIMO_STATUS variable to store the MIMO configuration data included in the MIMO parameter IE, i.e. parameter values corresponding to MIMO N/M ratio and MIMO pilot configuration.

When the UE receives any aforementioned RRC message, the UE clears the MIMO_STATUS variable if no MIMO parameter IE is included in the RRC message. If the MIMO parameter IE is included in the RRC message and the MIMO operation IE is set to "stop", the UE clears the MIMO_STATUS variable as well and further triggers lower layers to stop any operation about MIMO. If the UE is notified that the MIMO operation IE is set to "start", the UE stores the received parameter values in the MIMO_STATUS variable, and then triggers lower layers to start MIMO operation if all corresponding parameters are set. If the MIMO operation IE is set to "continue", the UE just stores the received parameter values in the MIMO_STATUS variable.

From the above, the prior art specification defines two ways for the UTRAN to stop the MIMO operation of the UE. One way is not including the MIMO parameter IE in the RRC message; the other is setting the MIMO operation IE to "stop". In the practice of the former way, the UTRAN requires no information bits; in the practice of the latter way, as the above, the MIMO operation IE requires two information bits for three parameter values related to the "stop", "continue" and "stop" operations. Thus, the latter way results in transmission of extra bits in the RRC messages for MIMO configuration.

SUMMARY OF THE INVENTION

The present invention therefore provides a method of improving the MIMO procedure for a network terminal and a UE of a wireless communications system and related communications device that can save radio resource.

The present invention discloses a method for improving a MIMO procedure for a network terminal of a wireless communications system. The method includes using only two parameter values for a MIMO operation information element (IE) of a MIMO parameter IE to indicate a user equipment (UE) to activate or continue MIMO operation, and indicating the UE to stop the MIMO operation by not including the MIMO parameter IE in an RRC message sent to the UE.

The present invention further discloses a communications device of a wireless communications system for improving a MIMO procedure to save radio resource. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes using only two parameter values for a MIMO operation information element (IE) of a MIMO parameter IE to indicate a user equipment (UE) to activate or continue MIMO operation, and indicating the UE to stop the MIMO operation by not including the MIMO parameter IE in an RRC message sent to the UE.

The present invention discloses a method for improving a MIMO procedure for a UE of a wireless communications system. The method includes stopping MIMO operation when a MIMO parameter IE is not included in an RRC message sent by a network terminal.

The present invention further discloses a communications device of a wireless communications system for improving a MIMO procedure to save radio resource. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes stopping MIMO operation when a MIMO parameter IE is not included in an RRC message sent by a network terminal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
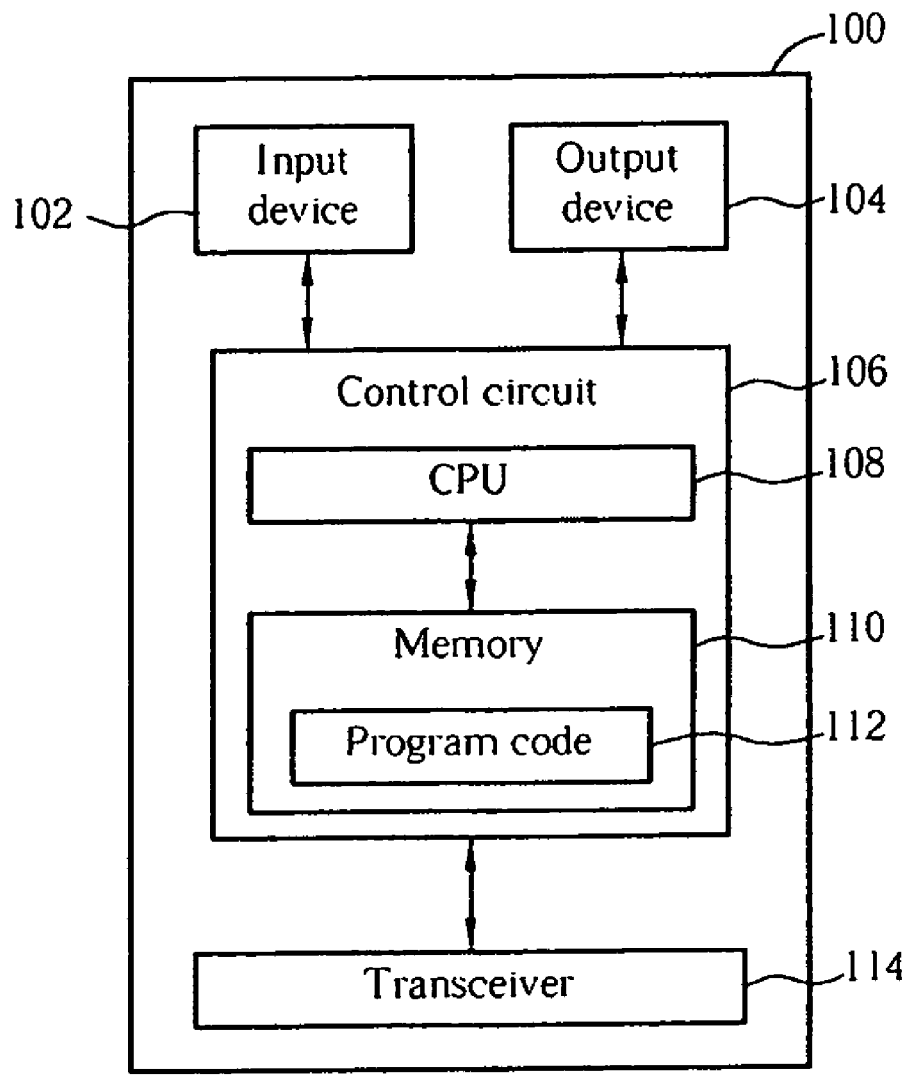
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a High Speed Package Access (HSPA) system of the third generation (3G) mobile communications system, supporting MIMO operation.

Figure 2:
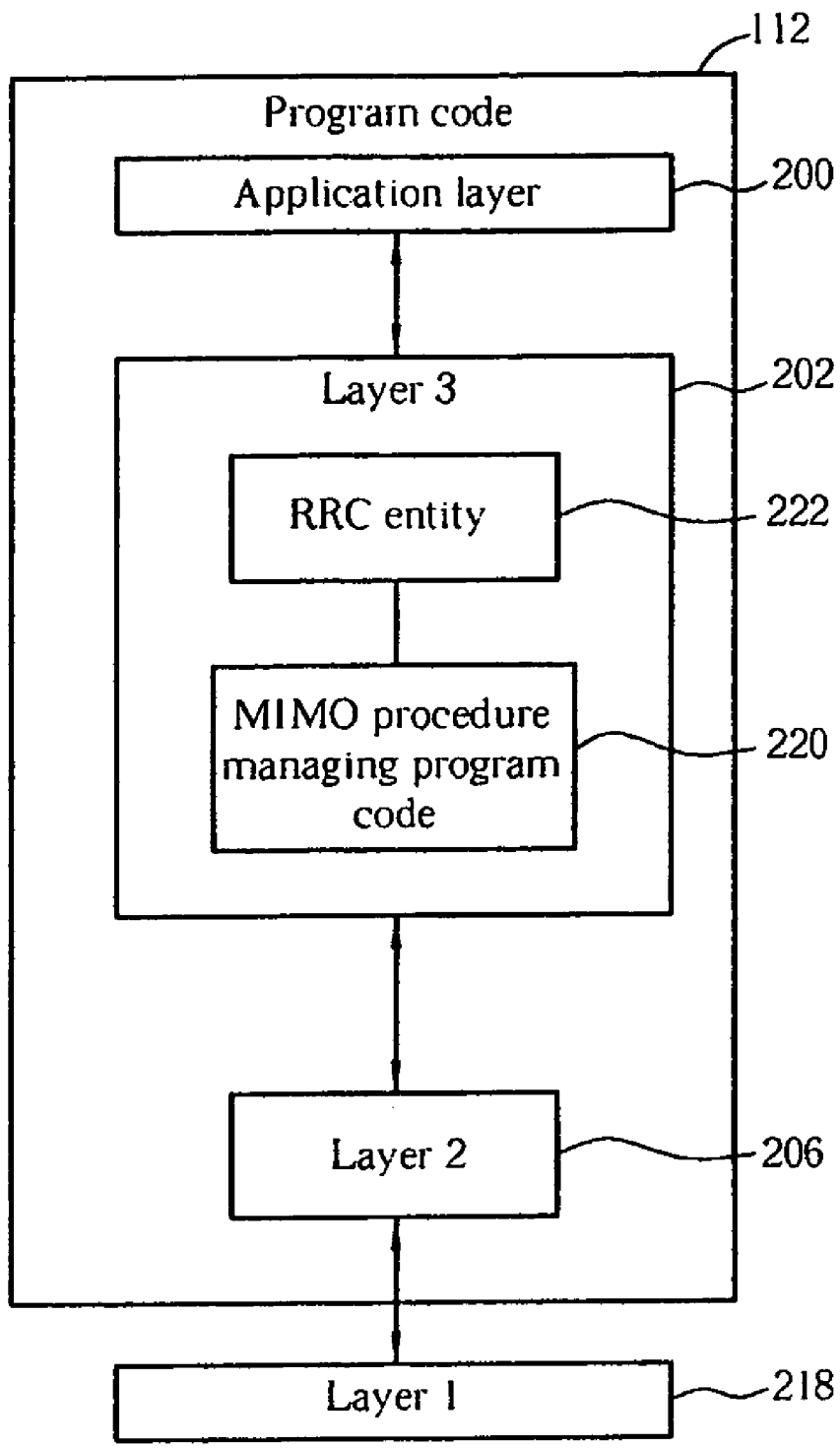
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 3 202 includes a radio resource control (RRC) entity 222, which is used for controlling the Layer 1 218 and the Layer 2 206 and performing peer-to-peer RRC communication with other communications devices. In addition, the RRC entity 222 can generate RRC messages and information elements (IEs) to control the Layer 1 218 and the Layer 2 206 or to exchange RRC configuration with other communications devices.

If the communications device 100 is employed in the universal terrestrial radio access network (UTRAN), the communications device 100 functions to generate a MIMO parameter IE and include it in an ACTIVE SET UPDATE, CELL UPDATE CONFIRM, or any reconfiguration message, so as to control MIMO operation of the UE. Alternatively, if the communications device 100 is employed in the UE, the communications device 100 functions to receive the aforementioned RRC messages and utilizes a MIMO_STATUS variable to store MIMO configuration data carried by these messages.

Figure 3:
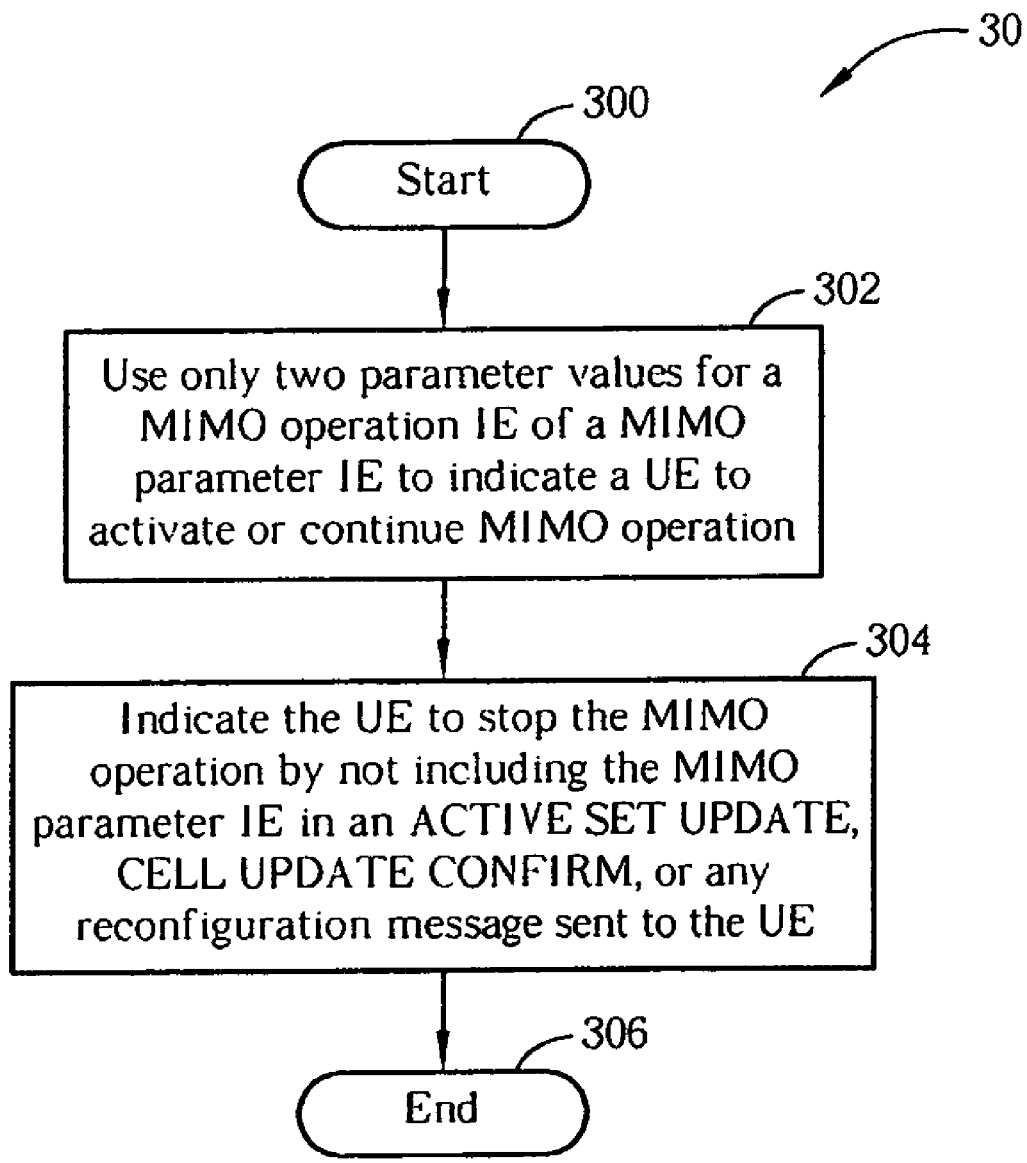
FIG. 3 is a flowchart diagram of a process according to an embodiment of the present invention.

The embodiment of the present invention provides a MIMO procedure managing program code 220 to modify existed MIMO configuration content and corresponding procedure in order to save radio resources. Please refer to FIG. 3, which illustrates a schematic diagram of a process 30 according to an embodiment of the present invention. The process 30 is utilized for improving the MIMO procedure for a UTRAN of a wireless communications system, and can be compiled into the MIMO procedure managing program code 220. The process 30 includes the following steps:
Step 300: Start.
Step 302: Use only two parameter values for a MIMO operation IE of a MIMO parameter IE to indicate a UE to activate or continue MIMO operation.
Step 304: Indicate the UE to stop the MIMO operation by not including the MIMO parameter IE in an ACTIVE SET UPDATE, CELL UPDATE CONFIRM, or any reconfiguration message sent to the UE.
Step 306: End.

Figure 4:
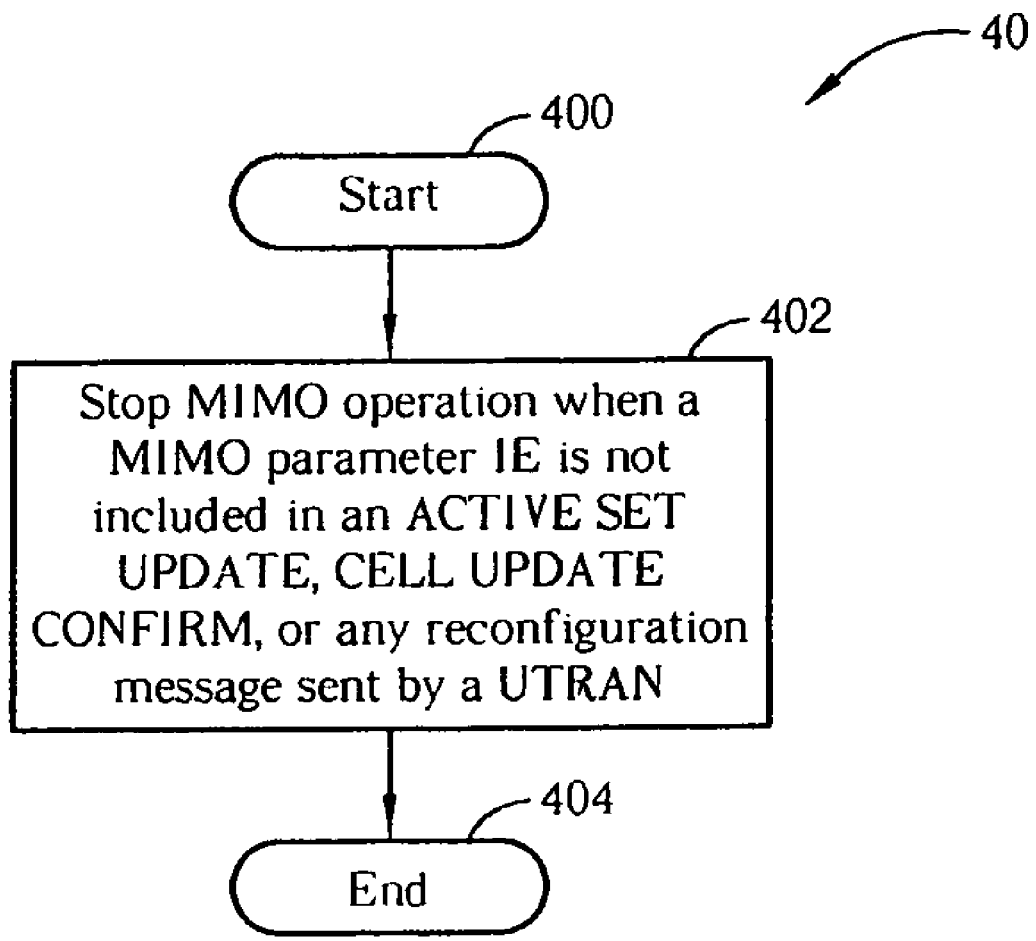
FIG. 4 is a flowchart diagram of a process according to an embodiment of the present invention.

Please refer to FIG. 4, which illustrates a schematic diagram of a process 40 according to an embodiment of the present invention. The process 40 is utilized for improving the MIMO procedure for a UE of a wireless communications system, and can be compiled into the MIMO procedure managing program code 220. The process 40 includes the following steps:
Step 400: Start.
Step 402: Stop MIMO operation when a MIMO parameter IE is not included in an ACTIVE SET UPDATE, CELL UPDATE CONFIRM, or any reconfiguration message sent by a UTRAN.
Step 404: End.

According to both the processes 30 and 40, only two possible parameters of "start" and "continue" are employed for the MIMO operation IE and used for indicating the UE to activate or continue MIMO operation. The UTRAN can use one information bit to set the MIMO operation IE. For example, "1" of the information bit represents "start", while "0" of the information bit represents "continue". When the UTRAN indicates the UE to stop the MIMO operation, the UTRAN always uses the way of not including the MIMO parameter IE in the aforementioned RRC messages. Accordingly, when the UE receives the RRC message, the UE clears the MIMO_STATUS variable and further triggers the lower layers (i.e. the Layer 1 218 and the Layer 2 206) to stop any operation related to MIMO if the MIMO parameter IE is not included in the RRC message.

In conclusion, according to the prior art, the MIMO operation IE includes three parameter values, and requires two information bits to represent the three parameter values. In addition, the UTRAN can still indicate the UE to stop the MIMO operation by setting the MIMO operation IE to "stop", resulting in waste of one information bit. Compared to the prior art, the embodiments of the present invention allow the UTRAN to indicate the UE to stop the MIMO operation by not including the MIMO parameter IE in the RRC message. The MIMO operation IE accordingly includes two parameter values of "start" and "continue". Thus, the transmission for the MIMO operation IE requires only one bit, thereby saving radio resources.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for improving a multi-input multi-output, called MIMO hereinafter, procedure for a network terminal of a wireless communications system, the method comprising:
   a radio resource control, hereinafter called RRC, entity of the network terminal using only two parameter values for a MIMO operation information element, called IE hereinafter, of a MIMO parameter IE to indicate a user equipment, called UE hereinafter, to activate or continue MIMO operation; and
   the RRC entity indicating the UE to stop the MIMO operation by not including the MIMO parameter IE in an RRC message sent to the UE.

2. The method of claim 1, wherein the parameter values represent "start" and "continue".

3. The method of claim 1, wherein the MIMO operation IE is set with one bit.

4. The method of claim 1, wherein the RRC message is a reconfiguration message.

5. The method of claim 1, wherein the RRC message is an ACTIVE SET UPDATE or CELL UPDATE CONFIRM message.

6. A communications device used in a communications system for improving a multi-input multi-output, called MIMO hereinafter, procedure, the communications device comprising:
   a control circuit for realizing functions of the communications device;
   a central processing unit coupled to the control circuit; and
   a memory coupled to the central processing unit for storing a program code;
   wherein the program code instructs the processor to perform the following steps:
     a radio resource control, hereinafter called RRC, entity of the communications device using only two parameter values for a MIMO operation information element, called IE hereinafter, of a MIMO parameter IE to indicate a user equipment, called UE hereinafter, to activate or continue MIMO operation; and
     the RRC entity indicating the UE to stop the MIMO operation by not including the MIMO parameter IE in an RRC message sent to the UE.

7. The communications device of claim 6, wherein the parameter values represent "start" and "continue".

8. The communications device of claim 6, wherein the MIMO operation IE is set with one bit.

9. The communications device of claim 6, wherein the RRC message is a reconfiguration message.

10. The communications device of claim 6, wherein the RRC message is an ACTIVE SET UPDATE or CELL UPDATE CONFIRM message.

11. A method for improving a multi-input multi-output, called MIMO hereinafter, procedure for a user equipment, called UE hereinafter, of a wireless communications system, the method comprising:
    a radio resource control, hereinafter called RRC, entity of the UE stopping MIMO operation when a MIMO parameter information element, called IE hereinafter, is not included in an RRC message sent by a network terminal;
    wherein only two parameter values for a MIMO operation IE of the MIMO parameter IE are used to indicate the UE to activate or continue the MIMO operation.

12. The method of claim 11, wherein the RRC message is a reconfiguration message.

13. The method of claim 11, wherein the RRC message is an ACTIVE SET UPDATE or CELL UPDATE CONFIRM message.

14. A communications device used in a communications system for improving a multi-input multi-output, called MIMO hereinafter, procedure, the communications device comprising:
    a control circuit for realizing functions of the communications device;
    a central processing unit coupled to the control circuit; and
    a memory coupled to the central processing unit for storing a program code;
    wherein the program code instructs the processor to perform the following steps:
      a radio resource control, hereinafter called RRC, entity of the communications device stopping MIMO operation when a MIMO parameter information element, called IE hereinafter, is not included in an RRC message sent by a network terminal;
      wherein only two parameter values for a MIMO operation IE of the MIMO parameter IE are used to indicate the UE to activate or continue the MIMO operation.

15. The communications device of claim 14, wherein the RRC message is a reconfiguration message.

16. The communications device of claim 14, wherein the RRC message is an ACTIVE SET UPDATE or CELL UPDATE CONFIRM message.

* * * * *